United States Patent [19]
Garnier et al.

[11] 4,086,625
[45] Apr. 25, 1978

[54] PROCESS FOR REPEATING CONTROL OF WORKING OPERATIONS OF SEVERAL MACHINES

[75] Inventors: Pierre Georges Garnier; Bruno Gaullier; Gérard Michel Jeanroy, all of Paris, France

[73] Assignee: Auvitec, Paris, France

[21] Appl. No.: 705,942

[22] Filed: Jul. 16, 1976

[30] Foreign Application Priority Data
Jul. 17, 1975 France .................... 75 22441

[51] Int. Cl.² ............................................. H04C 9/02
[52] U.S. Cl. ...................................... 364/104; 364/120; 364/113; 340/147 P; 340/147 SY
[58] Field of Search ........... 340/147 P, 147 MD, 347; 235/151.1

[56] References Cited
U.S. PATENT DOCUMENTS

| | | | |
|---|---|---|---|
| 3,265,932 | 8/1966 | Pettersson et al. | 340/347 M |
| 3,643,217 | 2/1972 | Morphew et al. | 340/147 P |
| 3,688,262 | 8/1972 | Liquori | 340/147 P |
| 3,819,906 | 6/1974 | Gould, Jr. | 340/147 P |
| 3,946,362 | 3/1976 | Sumida et al. | 340/147 P |

*Primary Examiner*—Eugene G. Botz
*Attorney, Agent, or Firm*—Browdy and Neimark

[57] ABSTRACT

For telecontrolling a plurality of machines, each machine is provided with logical/analog converter and successive words are formed comprising as many logic information as the number of operations to be controlled by the machines. The words are parallely recorded and may be then decoded so that the commands be repetitive.

31 Claims, 17 Drawing Figures

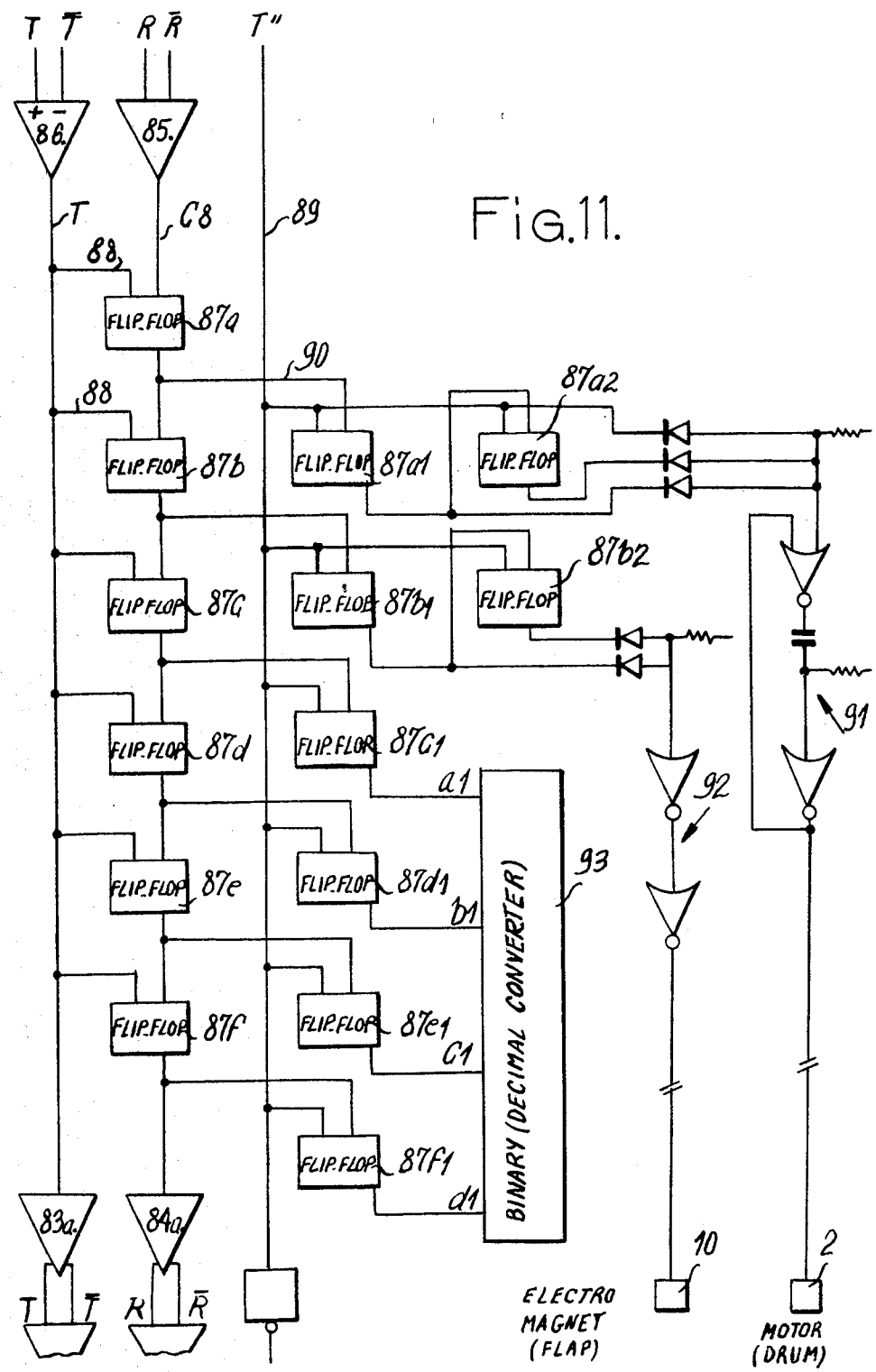

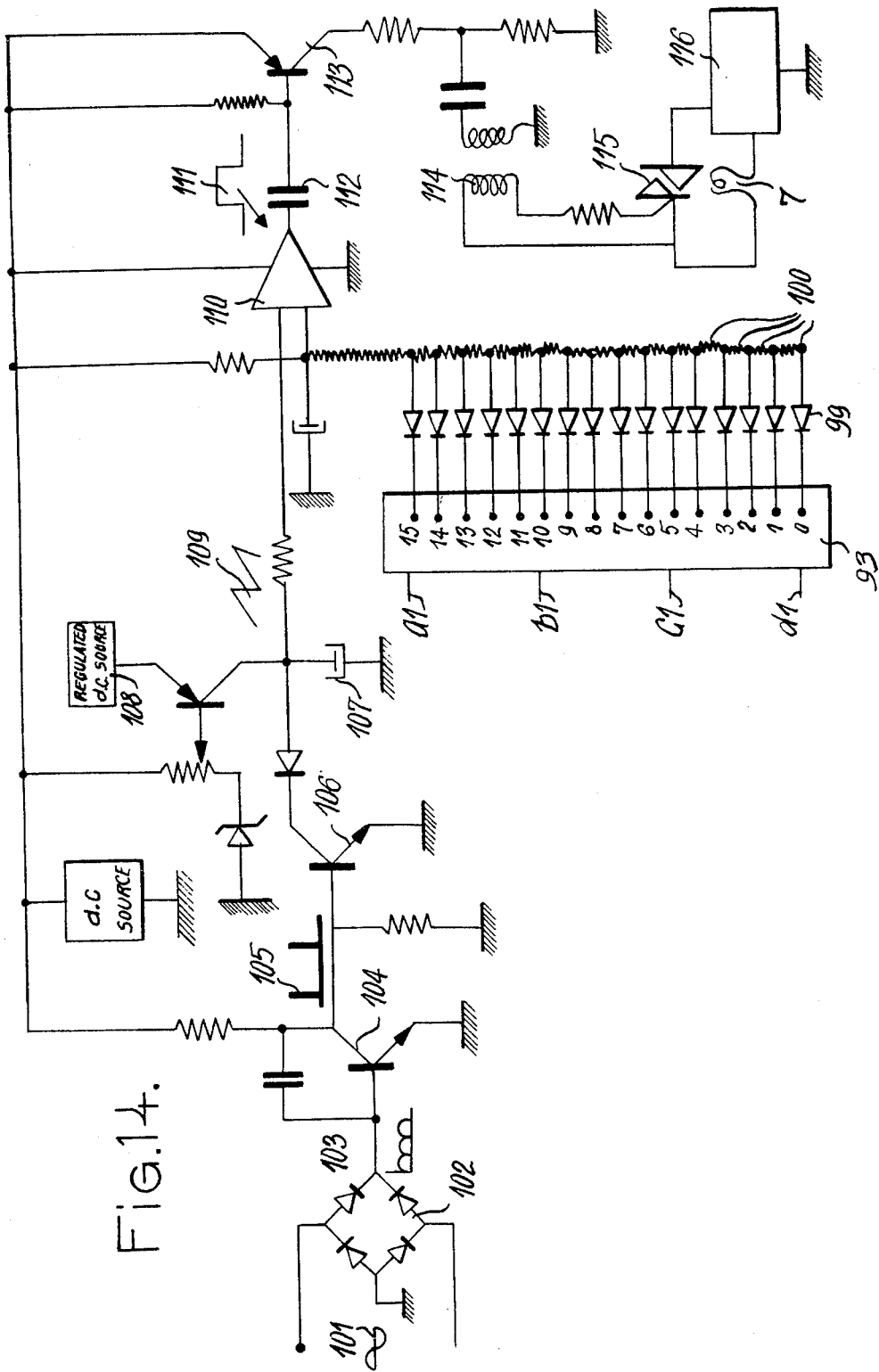

Fig.15.
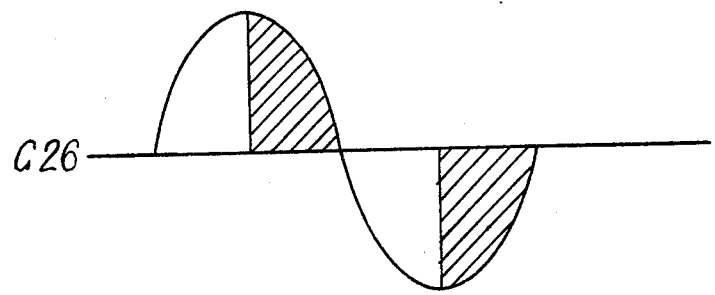
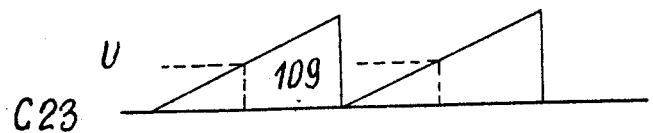
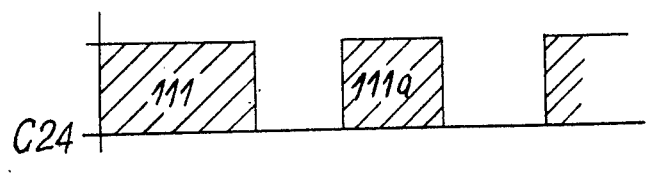

PROCESS FOR REPEATING CONTROL OF WORKING OPERATIONS OF SEVERAL MACHINES

BACKGROUND OF THE INVENTION

In very numerous technical fields, it is necessary to control the working operations of several machines, these machines being either of the same type or of different types, and each machine being intended to execute operations different from each other. Such is the case, for instance, in the audio-visual industry, when several slide projectors must be controlled to execute an audio-visual program during which each slide projector is controlled on analogy with one or several other projectors or in a different manner.

Effectively, one can imagine that in an audio-visual program, two projectors are coupled on a same zone of a screen to project, in succession, mixing views on this same zone, while other projectors project, on other zones of the same screen, other views that can be eventually occulted; a present program can then be repeated identically, any number of times.

In another technical field, machine tools as for instance lathes, milling machines or other machines should also be controlled in function of a given work that can be reproduced to manufacture various articles. The same is true for other types of machines, such as stamping machines, welding machines, cutting, folding machines etc.

Until now, devices are known, for instance the so-called numerical control devices that permit controlling a sequence of operations on a same machine and possibly a sequence of operations interesting several machines. However, these devices are very complex and require parallel links between the actual numerical control element and the various machines to be controlled or the different parts of machines to be controlled. This method thus lead to use a great number of conductors and a given device can only be used with the machine or the groups of machines for which it has been designed.

SUMMARY OF THE INVENTION

This invention creates a new control device that makes it possible to obtain the execution, possibly in repetition, of operations of any type, by any type of machine or group of machines, and that, while enabling without any structural change, a decrease or an increase of the number of the machines to be controlled by a simple link of particular control boxes, in series, by means of very few conductors the number of which being the same whatever be the number of machines or operations to be controlled.

In addition, according to the invention, a control program can be recorded on only magnetic medium: wire, tape, disk, drum or other analog medium, the program being possibly reproducible on any number of copies to program several groups of machines, which in turn do not require any matching operation.

Because of its implementation, the invention makes it possible to record programs on the magnetic tapes of objects as simple as mini-cassettes, and that without any risk for these commands to be unduly understood even if the magnetic tape is damaged in certain of its parts, for example crackled, or else cut and joined.

According to the invention, the process for the repeat control of working operations of machines of the same type, or of different types, is characterized in that a word is established which comprises a number of bits corresponding at least to the number of operations to be controlled for each of the machines, in that every machine is allocated with at least as many logical signs in the word as there are operations to be controlled for this machine, so that the word contains in series logical information respectively concerning every machine, in that every machine is fitted with a detector or convertor including as many logical detecting elements as there are bits for this machine in the word, in that the bit detectors are connected in series so that all the logical detecting elements are serially connected, in that the word is transmitted to the set of detectors so connected in series so that the detecting elements of said machines are respectively brought into logical states corresponding to the states of the word, in that new words are formed in sequence and contain the same bits or different bits spaced from one another by a time interval, in that the new words are correlatively transferred to the detectors of the machines, so that the initial received commands are confirmed or changed, and in that the established sequence of words is recorded to be used again any number of times for a repeated control of the same working operations by the same machines or by analog groups of machines.

This invention is extended to a device for carrying the above process into effect.

According to this second feature of the invention, the device for controlling working operations of various machines from commands in binary language, is characterized in that it includes at least one binary-analog converter per machine, every binary - analog converter including a number of input detectors, connected in series, equal to the binary number of the functions to be completed by the corresponding machine; cables with at least one wire per cable to connect together the binary-analog converters of all the machines so that all the input detectors are serially connected; at least an assembly generating and transmitting a word in binary language, that defines successive commands, in series, each command including a number of bits corresponding to the number of input detectors, stepping means to enter every bit into the successive detectors, so that each detector is brought at the end of each word to a state depending on the state of the corresponding bit in the word; and means to convert the state of each input detector into a control command for a working operation of the machine.

As explained above, this invention finds numerous applications and namely applications to the control of audio-visual devices and of various machine tools.

Various other features of the invention will appear from the following detailed description.

BRIEF DESCRIPTION OF THE DRAWINGS

An embodiment of the invention is shown, by way of non-limitative example in the accompanying drawings in which:

FIGS. 10–10a are sets of curves explaining the functions executed by the assembly of FIG. 9;

FIG. 11 is a diagram of the logical part of one of the logical-analog converter shown in FIG. 1;

FIGS. 12, 13 and 14 are electronic diagrams of the logical-analog part of the converter of FIG. 11;

FIG. 15 is a set of curves explaining the operation of an element shown in FIG. 14.

DETAILED DESCRIPTION OF THE PREFERRED EMBODIMENTS

Figure 1:
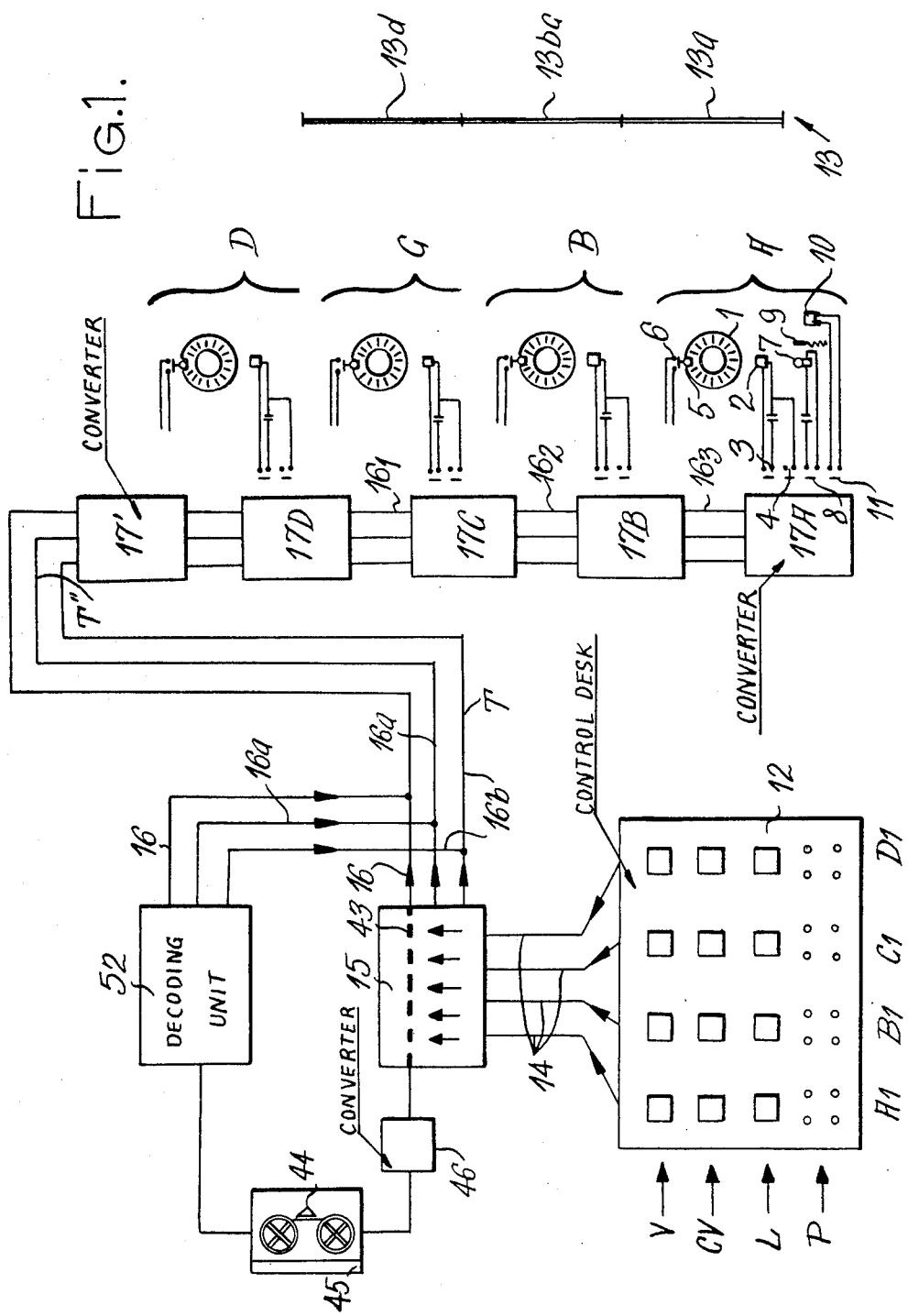
FIG. 1 is an overall diagram of the device according to the invention, applied to the control of slide-projectors.

The invention is described below, referring to the control of four machines A, B, C and D consisting of slide-projectors, each of which including:

(a) a drum 1, able to be driven in steps, by a reversible motor 2, controlled by switches 3 and 4. The drum 1 controls, in addition, through a cam 5, shown as a notch, a resetting switch 6;

(b) a projecting lamp 7 switched, on and off, by a switch 8;

(c) a flat flap 9 controlled by an electromagnet 10, excited in turn through a switch 11.

Because all the machines are identical, or at least substantially similar, the reference numerals given below have not been indicated on every machine.

The switches 3, 8, 11 of each A, B, C, D machines are controlled from a console 12, including sets of actuating buttons A1, B1, C1, D1 corresponding to each of the A,B,C,D machines.

Figures 2, 3:
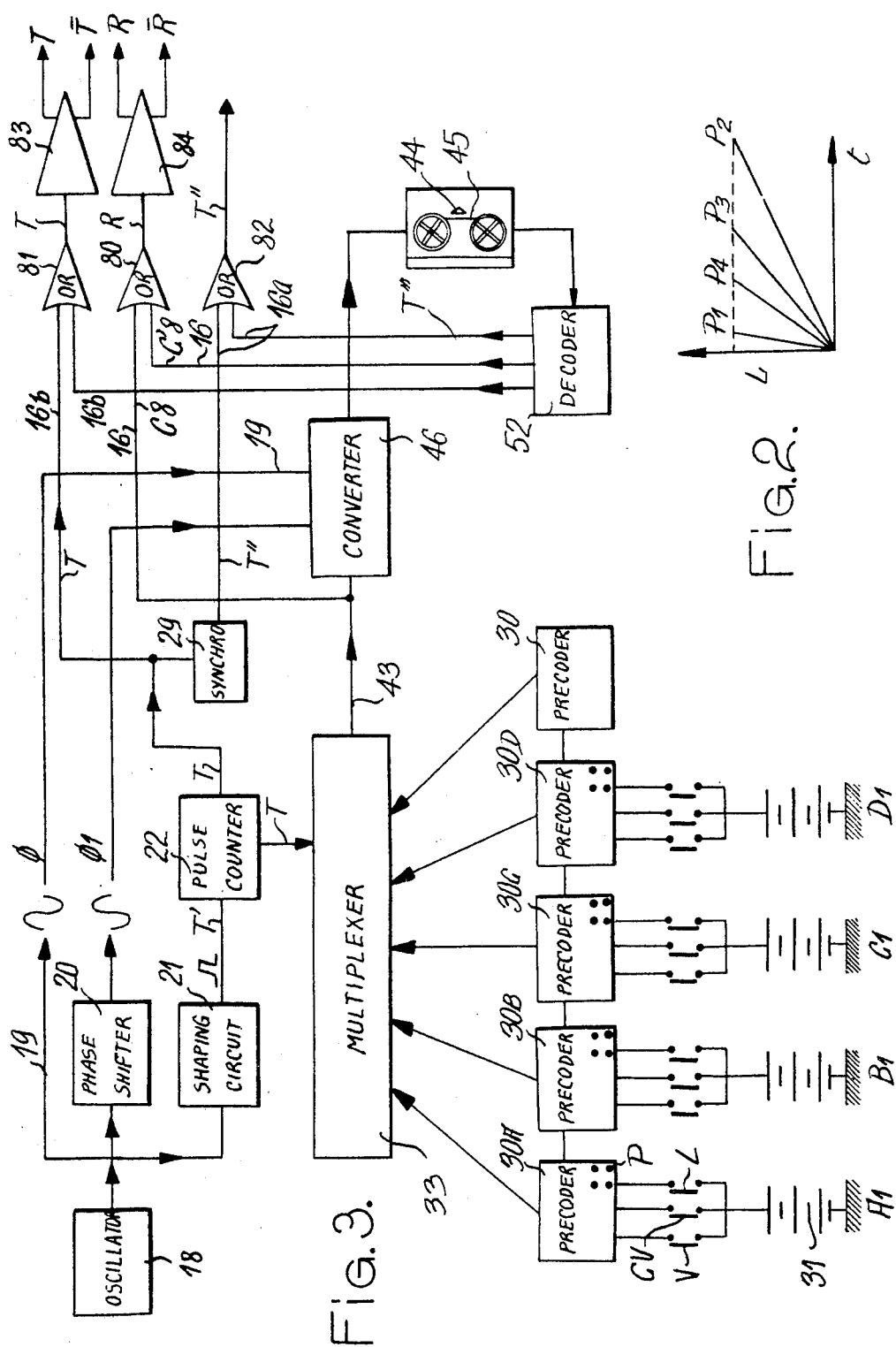
FIG. 2 is an explaination curve.
FIG. 3 is an expended block diagram of a part of the overall diagram of FIG. 1.

Each set of actuating buttons includes: a V button called "flap" from which switch 11 can be actuated, a CV button said "change of slide" from which one of the switches 3 or 4 for the motor 2 can be actuated to move the drum 1, an L button, so-called "light" button from which the switch 8 can be actuated, and four preselection P buttons to preset different time intervals during which the light supplied by the bulb 7 increases from a minimum to a maximum and conversely, which is illustrated schematically in FIG. 2 by means of four light curves L versus time $t$, the selection of one curve among these said curves leading to optical effects required for a given projection of slides contained in the drum 1.

From the above description, it can be seen that the four projecting machines A, B, C and D can be used, for example to project jointly onto the same screen 13, the machines A and D projecting on areas 13a and 13d and the machines B and C projecting, for instance, alternativeness, onto an area 13 bc, the alternativeness being obtained in mixing views because of the curves of light increase set from the pre-selecting buttons P. The flap 9 of the different machines allow the occultation of the projected images to obtain visual effects that can be associated with the projection of views onto either area of the screen.

The preceding description is only an example of application of the invention and the remaining of the disclosure shows the invention allows the control of any number of switchings on any machines, for instance machines-tools, that can replace the projectors as described above. Effectively a switch, such like 3, can control the driving motor of the guide-screw of a lathe, a switch such as 4 can control the driving motor of a mandrel, a switch such as 11 can control a control motor of the tool holder etc.

To help the understanding of the invention, the following disclosure will however concern the above projecting machines.

The actuating buttons (control switches): V, of changing of views: CV, of light, L, consist for example of mere switches, each of which closing a supplying voltage circuit and these control voltages are applied by means of parallel conductors 14 (FIG. 1) to an encoding circuit 15 described in details, below.

The coding circuit 15 is intended to transform voltage information coming from the control switches V, CV and L into binary data and, in addition, to provide said binary data, called below binary data signals, in a serial arrangement, while the control voltages received by the encoder 15 in the form of parallel data, variable in length, and possibly with an indefinite length, one or several rows of control buttons A1, B1, C1, D1 may be controlled simultaneously or successively.

The control binary coded data are transmitted along a command conductor 16. This conductor 16 leads to the input of a logical analog converter 17' for auxiliary functions dealt with below, then to a converter 17D, special for machine D, that is described in details below, and the output of this logical-analog converter is linked by a conductor $16_1$, analog with conductor 16, but having any length, to a third logical-analog converter 17C, special for machine C, and so on, by conductors $16_2$, $16_3$ to logical-analog converters 17B, 17A respectively, these last converters being special for machines B and A.

In the illustrated and described example, four machines are in service, and consequently four logical-analog converters are connected serially together and with the auxiliary function converter 17' as well as with the encoder 15, but a different number of converters can be used for instance less or more than four, the respective arrangement of said converters being always in series and hence without providing additional conductors to link them to the encoder 15.

It can be seen, from the above indications, that every machine is fitted with a logical-analog converter and the description then shows that the number of wires linking the various converters in series is independent of the number of converters and thus of the number of machines and even of the number of functions to be fulfilled, and that consequently all the linking cables including $n$ wires are always identical except as to their length.

To generate the commands, the encoder device 15 includes, as shown in FIG. 3, an oscillator 18 that delivers at its output a constant frequency sine voltage, for example 1000 Hz. The sine delivered by the oscillator is applied to a conductor 19, and the phase of this sine wave is called $\phi$ in what follows. This sine wave is represented by curve C1 in FIG. 7. The same sine wave is applied to a phase shifter amplifier 20 that delivers a sine wave $\phi 1$, with a phase difference of $\pi/2$ from the sine wave $\phi$. This second sine wave is represented on the curve C2 of FIG. 7.

The output of the oscillator 18 is, also, connected to the input of a shaping circuit 21 that transforms the successive cycles of sine wave $\phi$ into rectangular signals T', shown by curve C3. The T' signals have thus the same frequency as that of the oscillator 18 and the length of said T' signals is, for instance, equal to half an alternation of the sine wave $\phi$, if logical states 1 and 0 of equal lengths are required.

As the generation of the sine wave $\phi$ is continuous, the signals T' form timing or time base signals.

To help understand the invention, it is assumed below that the set of information to be transmitted to the four machines D to A, can be obtained by 32 bits forming words, and even more specially that every machine since they are identical in the considered example can be controlled by 6 bits, that is by 24 bits for the four machines A through D, the 8 remaining bits being intended to be used for auxiliary commands, not described in details, but that could, for example, consist of the control for the set of machines forming one or several sets reproducing music, a spoken comment, etc.

Figure 4:
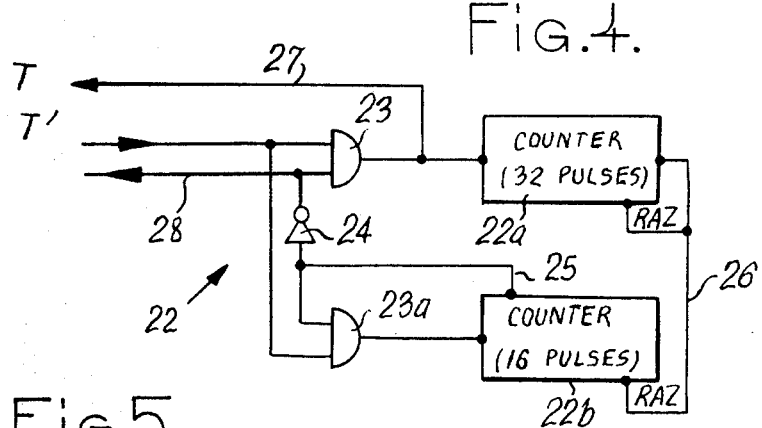
FIGS. 4 through 6 are explicative diagrams of some elements from the block-diagram of FIG. 3.

To define the length of the words including the above 32 bits, the clock pulses T' are applied to a pulse counter 22 which includes, as shown by FIG. 4, a counter 22a counting 32 pulses and a counter 22b counting 16 pulses T'. In practice, FIG. 4 shows that the pulses T' are applied to an input of a AND gate 23, the second input of which is connected through an inverter 24 to the output 25 of counter 22b, this output being also connected to one of the two inputs of a second AND gate 23a on the second input of which the pulses T' are also applied.

The output of flip-flop 22a counting 32 is connected to a resetting circuit 26.

The counter 22b counting up to 16, is designed to have its output 25 at state 0 when this counter has counted 16 pulses. Consequently, a state 1 is applied to the input of the gate 23 by the inverter 24. At every T' pulse, the gate 23 is open and said pulses, from which 32 are counted by the counter 22a, can be gated.

At the end of the counting of the 32 pulses, the counter 22a applies, through its output and the circuit 26, a pulse, for instance of state 1, to the counter 22b and is at the same time reset to zero. The counter 22b then begins to count 16 pulses, during which time the gate 23 is no longer conducting since a state 1 appears at the output 25, such state 1 bringing then the gate 23a to the conducting state when it receives pulses T'.

From the above description, one can see that, at the output of gate 23, are obtained, on a conductor 27, 32 pulses or bits followed by an interval without pulse corresponding to the 16 pulses or bits counted by the counter 22. These processes are illustrated by curve $C_4$ of FIG. 7.

During the counting of the 32 pulses, the input of gate 23, connected to the output of inverter 24, is still in the 1 state and consequently, on conductor 28 there is obtained a permanent 1 state during all the length of the 32 pulses as shown by curve $C_5$ of FIG. 7, this state being called below "word envelope" since said 1 state has the same duration as the 32 pulses forming the word.

The 32 bit pulses of the curve $C_4$ are applied, as shown in FIG. 3, at the input of a circuit 29 forming a so-called synchronizing signal, produced during the time of counting up to 16, i.e. between each successive words. For instance, the circuit 29 can be formed by a monostable circuit, the response time T of which is longer than the interval between the two T or T' pulses. Thus the monostable circuit is reset as diagrammatically shown by curve $C_6$ of FIG. 7, for each of these 32 pulses T and finally the synchronization signal T" is formed from the 32nd pulse T at a time $t$ after this last one.

To generate the commands, the console 12 is provided, as shown by FIG. 3, with a precoding circuit concerning every of these machines. The different precoding circuits are respectively denoted by 30A, 30B, 30C, 30D as far as the own precoding circuits of each of the machines A to D, and by 30 in asmuch as the circuit is devoted to the control of possible auxiliary functions.

Figure 8:
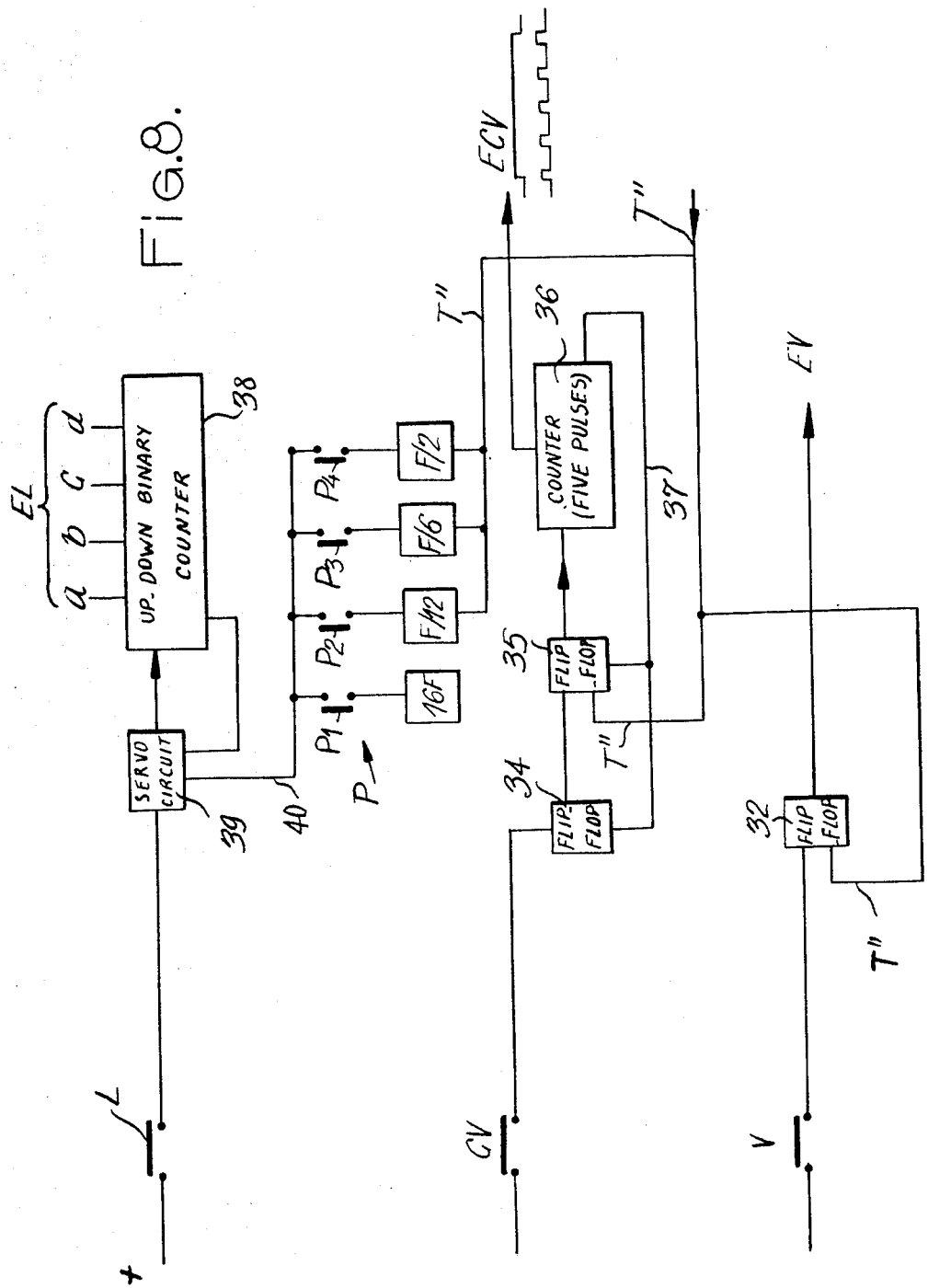
FIG. 8 is a diagram of elements illustrated as blocks in FIG. 3.

FIG. 8 illustrates the embodiment of one of the above precoding circuits, the other ones being made in the same manner.

The synchronization signal T", generated in the interval between two words is routed to every pre-coding circuit. The various switches V, CV and L are linked to a supply 31. In practice, these switches consist of interrupters, for instance mere push-button interrupters for switches V and CV, and of a locking push-button interrupter for the switch L since the rising time of the light intensity can be rather important and anyway variable, as has been indicated by reference to FIG. 2. On-off switches can also be used.

FIG. 8 shows that the switch V is connected to one of the inputs of a flip-flop 32, the second input of which receives the synchronizing signal T".

The output of flip-flop 32 is connected to the input EV of a step-by-step circuit 33, called multiplexing circuit, shown in FIG. 1 and described with more details herein below with reference to FIG. 5.

When the switch V is closed, a state 1 signal is applied to the input EV during a period corresponding to the closing of the switch V in order to maintain the flap 9 (FIG. 1) in the upper position during the same period of time.

The switch CV is connected to a first flip-flop 34, connected in turn to the input of a second flip-flop 35, with and AND function and on the second input of which the synchronizing signals T" are applied. The output of flip-flop 35 is connected to a counter 36 which, in this example, is designed to count five pulses. At the end of the fifth counted pulse, the counter 36 reset the flip-flops 34 and 35 by means of a reset circuit 37. Since the flip-flop 35 has an AND function, the successive T" pulses are sent into the counter 36 and the output of this counter is connected to the ECV input or "view changing input" of the multiplexing circuit 33, which receives a 1 state signal that is, in some manner the envelope of the five counted pulses as illustrated by FIG. 8 facing the ECV conductor.

From the foregoing, it can be seen that in this example, the ECV signal has a length corresponding to the length of the generation of five consecutive words, whatever be the length during which the switch CV is closed.

The switch L controlling the lamp is connected to a up/down counter 38 (FIG. 8) through a device 39, called the servo system of said counter, the function of which is similar to that of a flip-flop, in order to maintain the counter 38 in connection with data coming, through a conductor 40, from the four pre-selection buttons P.

More specifically:

the button $P_1$ connects the circuit 40 to a generator 16F, that is to say a generator delivering pulses at a frequency 16 times higher than the frequency of the synchronization signal T";

the button $P_2$ is connected to a frequency divider F/12;

the buttons $P_3$ and $P_4$ are respectively connected with F/6 and F/2 frequency divider.

The divided frequency is the frequency of the synchronization signals T''.

Figure 5:
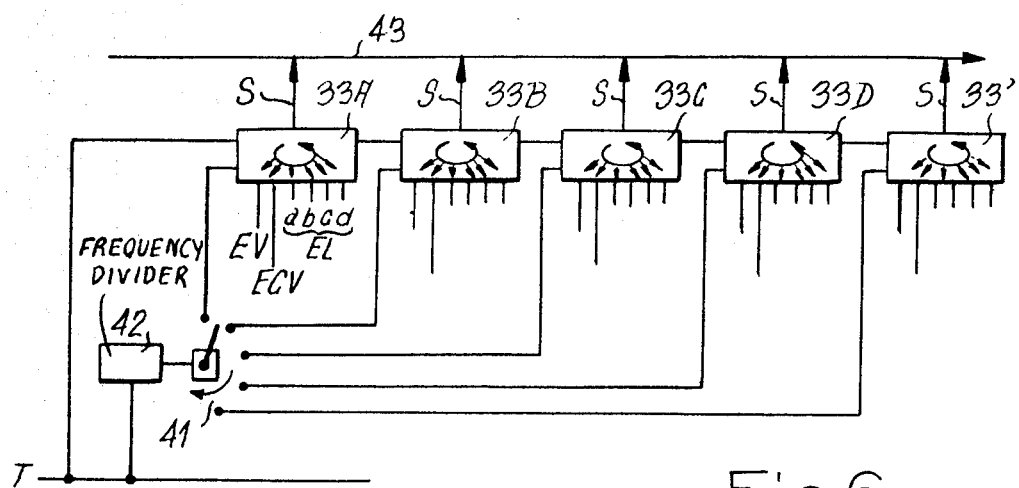

The up/down counter 38 has four outputs: a, b, c, d with respective weights 1, 2, 4 and 8, these four outputs are connected to the input EL, or light input of the multiplexing circuit 33 (FIG. 5). The up/down counter 38 is designed to count up to 16, that is from 0 to 15, then to stop and when controlled again, to count from 15 to 0. Thus, in a well known manner, for a four binary output device, the following binary signals are obtained in alternance in one direction or in the other depending on the up or down count (tableau A)

| | a | b | c | d |
|---|---|---|---|---|
| 0— | 0 | 0 | 0 | 0 |
| 1— | 1 | 0 | 0 | 0 |
| 2— | 0 | 1 | 0 | 0 |
| 3— | 1 | 1 | 0 | 0 |
| 4— | 0 | 0 | 1 | 0 |
| 5— | 1 | 0 | 1 | 0 |
| ... | | | | |
| ... | | | | |
| 15— | 1 | 1 | 1 | 1 |

The counting up speed or the counting down speed of the counter 38 is of course function of the time interval between the received pulses, and consequently of that of the switches $P_1$ to $P_4$ which is closed.

In the present example the frequency 16F of the switch $P_1$ is corresponding to 16 times the frequency of signals T'' and since the frequency of these last signals corresponds to the length of a word, according to curve $C_4$, as a result, the counter 38 counts up, and respectively counts down, 16 pulses during the length of one word of curve $C_4$. When the switch $P_4$ is closed, a frequency F/2 is applied to the counter 38, i.e. a pulse T'' after every group of two words, then to count from 0 to 15, the counter 38 uses a time interval equal to 32 words according to curve $C_4$.

The same calculation shows that, for the switch $P_3$, the number of words is 96, and that it is 192 for the switch $P_2$.

Still in other words, the switch $P_1$ allows a light increase which is quasi-instantaneous, of about 50 ms, since the oscillator 18 is indicated as delivering an alternative voltage at 1000 Hz, while the switch $P_2$ leads to a gradual light increase of about 10 seconds.

FIG. 5 shows the multiplexing circuit which comprises, in the case of the given example, five elements 33A, 33B, 33C, 33D, corresponding to the precoding circuits 30A–30D, and an element 33' corresponding to the circuit 30 for the possible auxiliary functions. In any way, the auxiliary function circuit is designed so that the last order or bit of the word is always at the logical state 0 in the present example, for reasons that will be dealt with herein below with reference to the disclosure of the decoding assembly of FIG. 9.

The logical data obtained as described herein before with reference to FIG. 8 are applied in parallel to each of the elements 33A to 33 D by the flap control inputs EV, view changing control inputs ECV, and light control inputs EL with a pre-selection set in a, b, c, d.

As it has already been explained before, six logical data can be introduced into each 33 elements, which corresponds to the six bits provided for each of them and shown on curve $C_7$ in correspondance to curve $C_4$ (FIG. 7) by the intervals A, B, C, D, and eight logical data for the auxiliary functions AUX.

The elements 33A–33D and 33' for the auxiliary functions consist of electronic stepping devices which successively scan their inputs EV, ECV and EL when they are activated by any electronic stepping device 41, itself controlled by a frequency divider 42 that receives pulses T of the curve $C_4$ in order to control the one step advance of the stepping device 41, first after eight pulses, then every six pulses, four times; such stepping device being reset during the interval between two words. It thus can be seen that the element 33A is first considered, then the element 33B, etc . . . The elements 33' and 33A, 33B, etc . . . also receive the pulses T, and these elements are for instance designed to only respond to the leading edges of said T pulses. The multiplexing circuit herein below, described in the form of a stepping circuit can of course be replaced by all other elements known in the art and playing the same role.

Figure 7:
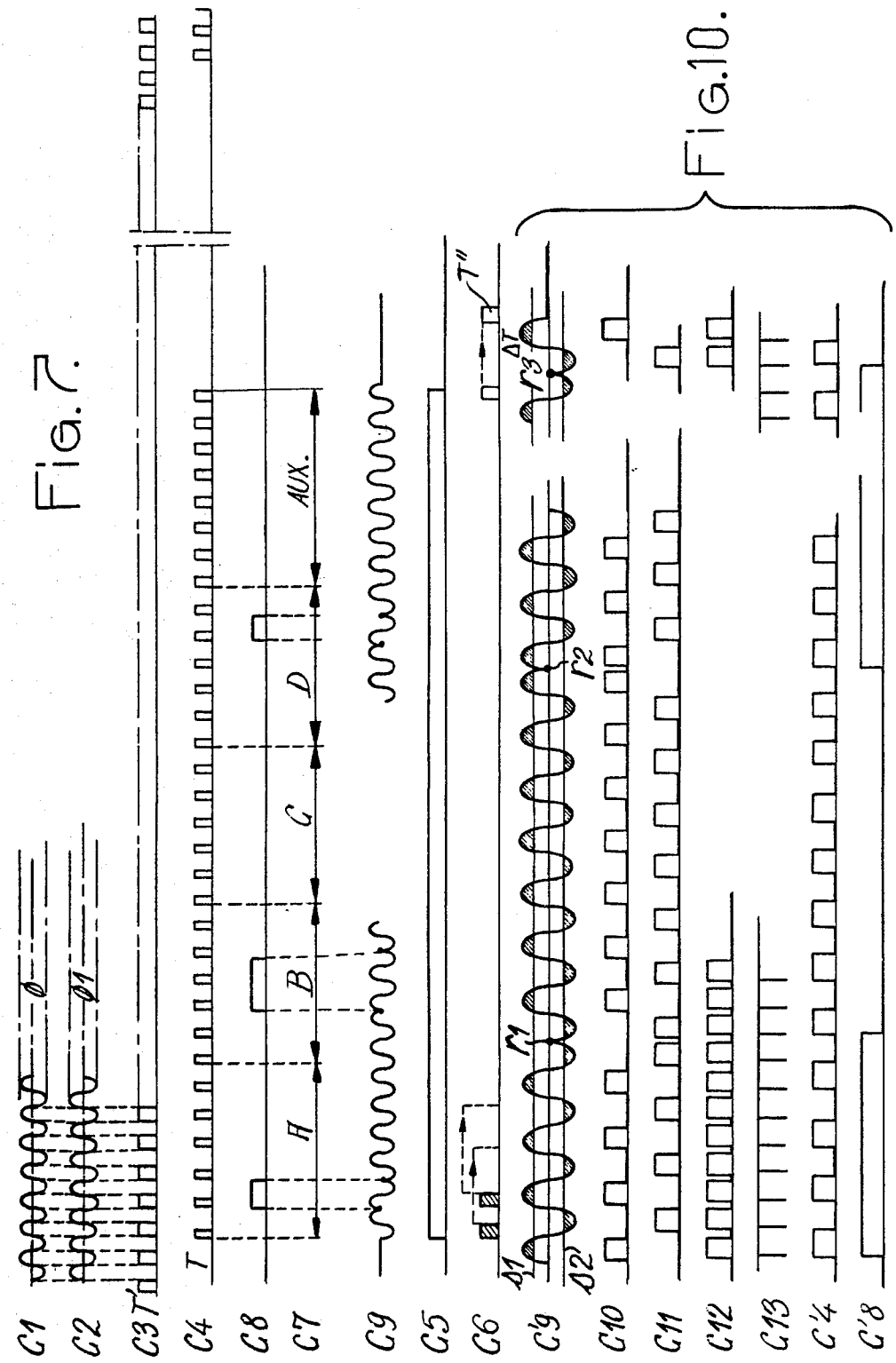
FIG. 7 illustrates a set of curves obtained in various points of circuits according to the diagrams of the preceding figures.

From the foregoing, it appears that the bits applied in parallel to the inputs of elements 33A, 33B, etc . . are transmitted in succession by the outputs S of these elements to a collecting line 43, called BUS line, in which said logical data are introduced in series, with the configuration shown by way of example on the curve $C_8$ of FIG. 7. Effectively, it appears that for the element 33A, a signal of logical state 1, which can correspond to a command of view changing, begins with the second corresponding pulse of the words of curve $C_4$ and ends with the leading edge of the third pulse. For the element 33B, the involved pulses are the third and fourth pulses of the corresponding part of the word, which can correspond to a command of an increase or a decrease of light, according to the position of the up/down counter 38. The element 33C contains no command and finally the element 33D contains another light command. It appears in this way, that the commands for all the machines are in the logical form and arranged in series, all the commands being contained in a word and the successive words enhancing or modifying said commands.

The command signals of curve $C_8$ may have to be stored in a memory, and according to the invention, it appeared advantageous to record them on any magnetic medium, for instance on a magnetic tape, so that the program prepared from the console 12 can later on be reproduced without any manual operation. However, logical commands are difficult and even impossible to record normally on a magnetic medium, and that cannot be done on poor quality magnetic medium, such as magnetic tapes for cassettes. For this operation, the encoder 15 in which are formed the commands of curve $C_8$, is connected to the writing head 44 of a tape recorder 45 through a converter 46 (FIG. 1).

Figure 6:
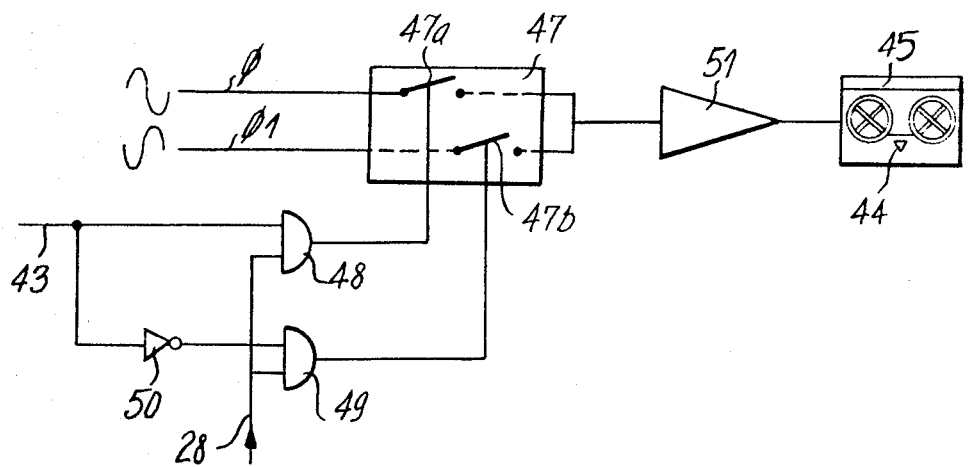

FIGS. 3 and 6 show the sine waves $\phi$ and $\phi_1$ having a phase difference of $\pi/2$ applied to a switching circuit 47 comprising two switching devices 47a, 47b, respectively activated by the outputs of the AND gates 48 and 49. One input of the AND gate 48 is connected with the BUS line 43, and this BUS line is also connected to one input of the gate 49 but through an inverter 50. On the other hand, a second input of the gates 48 and 49 is connected with the line 28 (FIG. 4) that transmits the word envelope, which is shown on curve $C_5$.

Referring to both FIGS. 6 and 7, it can be seen that the opening of the gates 48, 49 requires first of all the existence of the word envelope of the curve $C_5$, which provides a state 1 on one input of each of the two gates.

When a state 0 is present on the BUS line 43, that is to say when there is no command, the gate 48 remains closed but the inverter 50 establishes a state 1 on the second input of the gate 49, which results in the closure of the switch 47b. Consequently the sine wave $\phi_1$ crosses the switching circuit 47 and is applied through an amplifier 51 to the writing head 44 of the tape recorder 45.

As soon as a command appears on the BUS line 43, the gate 48 turns on during all the length of this command. As a result, the switch 47b is open and the switch 47a is closed and, in consequence, the sine wave $\phi$ is considered, which is shown by the curve $C_9$ that shows a first point where the direction changes as soon as the first order of curve $C_8$ appears, then a second direction changing point appears at the end of this command, since the switching circuit is again acting when the curve $C_8$ presents another 0 state.

The inspection of curves $C_8$ and $C_9$ reveals that the phase of the sine wave outgoing from the switching device 47 is reversed in synchronism with each command, the sine curve $C_9$ of FIG. 7 being an image of the command curve $C_8$ and presenting the special feature of being easy to record on any magnetic support because of its sine wave shape and, moreover the sine wave form is quite appropriate to be transmitted through the circuits of any type of recorder without noticeable distortion.

When the commands are recorded in the tape recorder 45, according to the shape of curve $C_9$, they must be transformed again into logical command data, in conformity with those of curve C8 to be used in the logical-analog converters 17A to 17D of each machine A to D. For that, the curve $C_9$, after being read is introduced into a decoding device 52; a detailed embodiment of this decoding device 52 is shown in FIG. 9.

The reading head of the tape recorder 45 is preferably connected, through a high impedance input stage 53 forming a filter, to positive 54 and negative 55 comparators having also an input controlled by a level controlling device 56.

Figure 9:
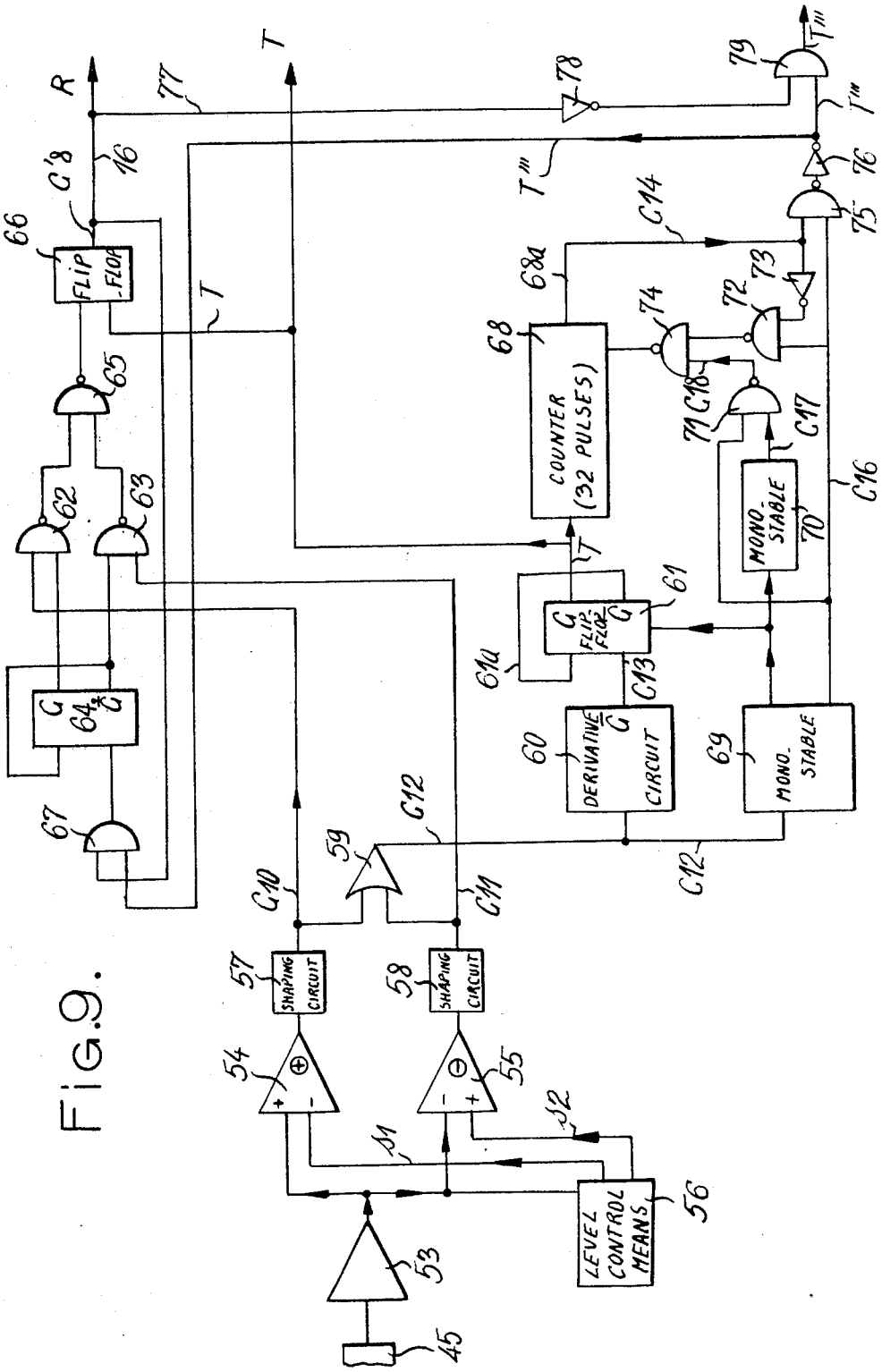
FIG. 9 is a diagram of a so-called decoding assembly.
Figure 10A:
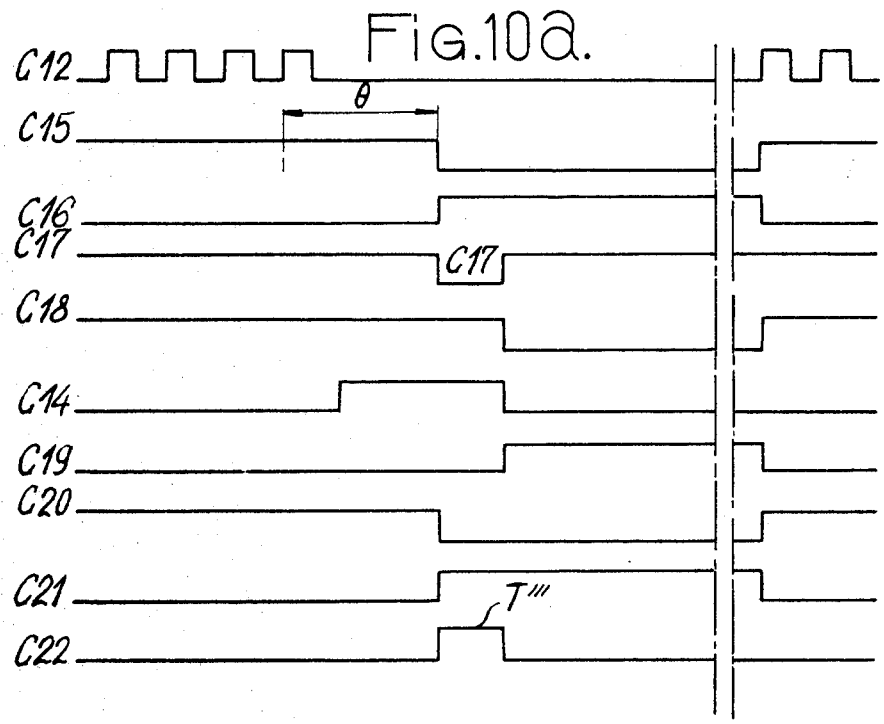

The curve $C'_9$ of the FIG. 10 shows, at a larger scale, a part of word taken from its origin and recorded in a manner similar to that described in reference with FIG. 9. Two points of direction changes $r_1$, $r_2$, typical of logical data can particularly be seen.

The effect of the level control device 56 is to make the positive and negative comparators 54 and 55 to only consider the parts of the positive and negative half-waves exceeding the respective levels $s_1$ and $s_2$, which allows to eliminate the affect of interferences that could be recorded.

The positive and negative comparators 54 and 55 are connected respectively to the shaping circuits 57 and 58 which transform the portions of the half-sine waves respectively exceeding the levels $s_1$, $s_2$ into square-wave signals $C_{10}$, $C_{11}$. The outputs of the shaping circuits 57, 58 are connected to an adder 59 at the output of which square signals $C_{12}$ are thus obtained. It is interesting to note that the frequency of the signals $C_{12}$ thus corresponds to twice the frequency of the signals T of curve $C_4$, that is to say the frequency of the clock signals or the timing signals of a word.

The signals $C_{12}$ are applied to a differenciating circuit 60 responding to the leading edge of the signals C12 and forming, as shown by curve $C_{13}$, negative pulses derived from said C12 signals. The differenciating circuit 60 is connected to one input of a flip-flop 61 which is set and reset alternatively by each of the pulses of the curve $C_{13}$, this being obtained by a feed back circuit $67_a$. At the output of flip-flop 61, signals T are thus obtained which exactly duplicate the signals T of the curve $C_4$ and are shown in FIG. 10, on the curve $C'_4$.

The shaped signals $C_{10}$ and $C_{11}$ are respectively transmitted to one of the two inputs of the respective NAND gates 62 and 63, the other input of which being connected to the two outputs Q, Q, having complementary logical states of a flip-flop 64, the function of which will be described herein below.

The outputs of NAND gates 62, 63 are connected to the inputs of a common NAND gate 65 connected, by its output, with one input a flip-flop 66 with an AND function which receives, on another input, the signals T of curve $C'_4$. The output of the flip-flop 66 is connected to the conductor 16 that transmits the commands and this output is also connected to an AND gate 67, the second input of which receives the synchronization signal T'', regenerated as will be explained later on.

It has been stated that the last bit of each word of the curve $C_8$ is at the 0 state. Consequently, such state 0 must reappear at the output of the flip-flop 66 to be sure that the logical orders transmitted to the conductor 16 are correct. If such is the case, a 0 state is applied to both inputs of the AND gate 67 since a synchronization signal T'' cannot be present, as it is only produced some time after the end of the emission of the bits of one word in the interval between two words. The AND gate 67 consequently maintain the flip-flop 64 with its output Q at the 1 state.

When the pulses of curve $C_{10}$ are also applied to the other input of the NAND gate 62, the output of this gate, and then one of the inputs of the NAND gate, are in the 0 state. The NAND gate 63 has an input at the 0 state, this input being connected to the output Q of the flip-flop 64, and the other input receives the pulses of curve $C_{11}$. Consequently, its output is always at the 1 state, in opposition to the output of the gate 62 that is alternatively at the 1 state and at the 0 state. The same is true for the NAND gate 65 that then only transmits the $C_{10}$ pulses to the flip-flop 66.

The flip-flop 66 being an AND gate and receiving the timing pulses T of curve $C'_4$ compares, in consequence, the pulses of the curve $C_{10}$ to the timing pulses. The curve $C'_8$, which is the homolog of the curve $C_8$ of FIG. 7, shows that at the output of the flip-flop 66, rectangular command signal are obtained and that they are the image of the sine wave signals with opposite phases of the curve $C'_9$.

Effectively, at the beginning of the word shown in FIG. 10, the leading edge of the first pulse $C_{10}$ is coincident with the leading edge of the first pulse $C'_4$, and consequently a 1 state appears on the curve $C_8$ which represents the orders. It is the same for the second pulses $C_{10}$, $C'_4$ and so on. It is then stated that at the first point of direction change $r_1$, a pulse $C_{10}$ could not be formed. Consequently, the leading edge of the corresponding pulse T changes the state of the flip-flop 66. When considering the second direction change point $r_2$ of curve $C'_9$, it appears that there is a coincidence between a pulse $C_{10}$ and a pulse T, and that consequently the state of flip-flop 66 changes again, though the pulses $C_{10}$ and T are not coincident in the time interval between the points $r$ and $r_2$. Finally, the end of curve $C'_9$ shows a last point of direction change $r_3$ which reveals again a new time difference between the pulses of the curve $C_{10}$ and the corresponding pulse T so that the state of the last bit is effectively 0.

Due to the design of the tape recorder 45, the read phase of curve $C'_9$ may be reversed. In this case, the last bit of the first read word appears at state 1 at the output of flip-flop 66, and then the output of the AND gate 67 is brought to state 0, which, in turn drives the state of the Q output of flip-flop 64 to "1".

Consequently the NAND gate 63 is brought to the operating conditions described above for the NAND gate 62 and then, the pulses of the curve $C_{11}$ are brought to the flip-flop 66 in which they are compared to the T pulses of curve $C'_4$. There is thus a phase difference of $\pi/2$ to take in account the design phase difference of the considered tape-recorder 45 in use.

The above decoding sub system takes in account not only the phase characteristic of the tape recorder, but also the reading errors which may originate from various reasons in particular from a break repaired by a sticking of the magnetic tape, from accidental folds of the magnetic tape, from an accidental separation of the tape and of the reading head, and from any other incident of this type. Effectively, the timing pulses T, of the curve $C'_4$, out coming from the flip-flop 61 are introduced in a counter 68 designed to count 32 pulses and to form an output signal 68a of logical state 1, shown on curve $C_{14}$ of FIG. 10a, this curve $C_{14}$ showing the end of a word, the beginning of a next word and, consequently, the interval between these two words. Consequently, if due to any defect, a given word does not include the 32 timing bits, the counter 68 does not deliver at its output, a signal of a state 1.

The pulses of curve $C_{12}$ having a frequency equal to the double of the frequency of the read sine wave are introduced in a monostable calibrating circuit 69 having two outputs of logical complementary states G, Ḡ. The calibration of the monostable circuit 69 is chosen in order that its time constant is, for instance, equal to $\theta$ and always longer than the interval separating two pulses of the curve $C_{12}$. In this manner, each pulse of the curve $C_{12}$ ensures the holding of the monostable 69 in forming a word envelope longer than said word due to the time constant $\theta$ introduced from the last pulse of the curve $C_{12}$. This is shown by curves $C_{12}$ and $C_{15}$ of FIG. 10a with the curve $C_{16}$ showing also the same phenomenon, but at the output G of the monostable circuit 69.

By calibrating the monostable 69 with a time constant, there results an information signal which ends after the end of the word. This information signal is used to control by the output Ḡ a monostable 70, the output of which delivers a short pulse $C_{17}$ immediately at the end of the time constant $\theta$. This information signal chosen to be at the 0 state, is applied as well as the information out going from the output G of the monostable 69, on a NAND gate 71 so that the output information of this gate is at state 1, as shown by curve $C_{18}$, until the end of said pulse $C_{17}$. Besides, the information from the output G of the monostable 69 is brought to the first input of a NAND gate 72 which receives, on its second input, the output information of the counter 68 but through an inverter 73. Thus, when the counter 68 has normally counted 32, the two inputs of the NAND gate 72 are at a state 0, then the output of this gate is at state 1. This state is applied to one input of a NAND gate 74 receiving, on its other input, the information of the curve $C_{18}$, i.e. an information of a state 1. Consequently, the output of NAND gate 74 is itself at state 1 (curve $C_{19}$), and this state permits the reset of counter 68.

If the counter 68 has not been able to count 32 pulses, then its output 68a is not at a state 1 but at a state 0. Consequently, a 1 is applied at one of the inputs of the NAND gate 72, the output of which is at a state 1 as shown by curve $C_{20}$. Consequently, the state of the output of the NAND gate 74 is also changed and becomes 0, as indicated by curve $C_{21}$. Consequently, the counter 68 is not reset.

The information of the output G of the monostable 69 (curve $C_{16}$) and the state information at the output 68a of the counter 68 are compared in a NAND gate 75. In other words, the gate 75 must detect, on one hand, that the word envelope established by the monostable 69, i.e. refreshed by each pulse $C_{12}$ has been correctly formed and on the other hand, that the counter 68 has correctly counted 32 pulses and displays a logical state 1 at its output. In this manner, the output of the gate 75 stays in 0 state for a short period, i.e. until the reset of counter 68, which forms a first information that checks the good operation conditions of the various circuits.

This information is that used through an inverter 76 to set one of the inputs of the AND gate 67 to state 1. It is a synchronizing signal or yet a command acknowledging signal T''', shown on curve $C_{22}$ that is identical with the synchronizing T'' signal already described, and can be used as will be explained hereinbelow to fulfill the same functions.

Should the output of flip-flop 66, that transmits the commands on line 16, not be in the state 0, not only for the last bit of a word but also during the time interval between two words, the abnormal state 1 would be transmitted by a conductor 77 and an inverter 78 to the input of a NAND gate 79 which also receives the synchronization or acknowledging signal T''' and, consequently, the gate 79 would prevent the transmission of signal T'' required to execute the operations that are now described.

Referring against to FIG. 1, it appears that the encoder 15 or decoder 52 applies logical command data to the line 16. In the same manner, the encoder 15 or the decoder 52 delivers the synchronization signals T'' or T''' on a line 16a, only the reference letter T'' being represented for sake of simplification and, besides, a line 16b delivers the timing base T, i.e. the 32 bits distant by a 16 bit length.

In practice, the encoder 15 or decoder 52 are only used and, then, as shown on FIG. 3, the command data coming from the encoder BUS line 43, or the command data from the decoder 52, are routed by their respective lines 16 to an OR gate 80. Similarly, the timing base, consisting of the T signals is routed, by the conductors 16b to an OR gate 81 and the synchronization signal T'' and respectively T''' to an OR gate 82.

The OR gates 80 to 82 are the very outputs that form commands and these gates must be connected by high length cables to the various machines to be serially controlled.

FIG. 3 shows that it has been considered as advantageous for preventing any interferences from spurious signals and for taking the line-loss in account, to bring the time base T and the commands R respectively to the amplifiers 83 and 84 with complementary outputs T, T̄ and R, R̄. That can also be done for the synchronization signal T'', through it has not been represented.

Then, in the present example, each connecting cable connecting in series the various converters 17D–17A as well as a converter 17' for the possible auxiliary functions, which converter is only shown in FIG. 1 to facilitate the following explanations, preferably comprises seven conductors, namely: a command conductor R, a command conductor R, a time base conductor T, a time base conductor T, a synchronization signal conductor T'', a reset conductor for every drum 1 and a ground conductor.

In FIG. 11 which illustrates the logical portion of the converter 17D, for example, only the five first above conductors are shown as can be seen in the upper part of the figure. The command conductors R and R are connected to the two inputs of a circuit 85 that shapes the command signal according to curve $C_8$ or $C'_8$ and, similarly, the two conductors T and T are connected to the shaping input 86 for time base signals T. The shaping circuits 85 of the commands is connected to flip-flops $87a$, $87b$ ... $87f$, which are connected in series together, and with an amplifier $84a$ with two complementary outputs R, R. The number of the above flip-flops $87a$ through $87f$ is the same as the number of the functions to be executed, six, in the present example.

Similarly, the time base pulse shaping circuit 86 is connected to a second input of each of the above flip-flops by parallel conductors 88 and to the input of an amplifier $83a$ with two complementary outputs, T, T.

The above amplifiers $84a$ and $83a$ are identical to the amplifiers 84, 83 of FIG. 3 and execute the same functions, i.e. they prepare data to transmit them in a complementary shape to the following converter, in this case the converter 17C that can be separated from the converter 17D by a large distance. In the same manner, the synchronization signal T'' is conducted along a line 89, eventually fitted with filters, serially, from one to the other converters 17C, 17D etc. The outputs s of flip-flops $87a$–$87f$ are connected by conductors 90 respectively to one input of memory flip-flops $87a_1$ to $87f_1$, the second input of which is connected to the conductor 89 of the synchronization T'' signal.

The output of flip-flop $87a_1$ is connected on the one hand, to an input of a monostable circuit 91 which in the present example, has been set to a 0.25 second time constant, which corresponds to the normal transmission direction of three words. This output of the flip-flop $87a_1$ is further connected to one input of a flip-flop $87a_2$, receiving on its other input the synchronization signal T'', such signal is moreover applied to the input of the monostable circuit 91, as well as the output $s_1$ of the flip-flop $87a_2$. It appears from the foregoing that the flip-flops $87a$, $87a_1$ and $87a_2$ form a cascade circuit for the control of the monostable 91 which delivers a signal intended to control, in turn, the motor 2 driving the drum 1 for one step.

A similar circuit is provided for the control of the electromagnet 10 that drives the flap 9, i.e. the output of the flip-flop $87b_1$ is connected to the input of an amplifier 92 and, also, to the input of a second flip-flop $87b_2$ having its output in turn connected to the input of the amplifier 92.

The input of the flip-flop $87b_1$–$87b_2$ are also connected to the conductor 89 which routes the synchronization signal T''.

As far as the flip-flops $87c_1$–$87f_1$ are concerned, they are connected with the inputs $a_1$, $b_1$, $c_1$ and $d_1$ having respectively the logical weights 1, 2, 4 and 8 of a binary/decimal decoder 93. This decoder has for its purpose to ensure the control of the supply of the lamp 7 and its inputs $a_1$ to $d_1$ correspond, as indicated by their reference, to the outputs a, b, c, d of the up/down counter 38 described with reference to FIG. 8.

The other converters 17b, 17c, 17d include the same elements, that is a first set of series flip-flops $87a$ to $87f$ and complementary sets of memory flip-flops.

It appears from the above disclosure that all the flip-flops $87a$ to $87f$ of all the converters are, on the one hand, serially connected to one another and consequently receive, serially, the command information of the curves $C_8$ or $C'_8$ and, on the other hand, connected to the conductor routing the time base pulses of the curve $C_4$ or $C'_4$, i.e.: 32 pulses for each word.

From curve $C_4$ of FIG. 7, it appears that the first time-base pulse T is applied to all the flip-flops $87a$, $87b$ etc ... of all the converters but without involving any modification of their state. The second pulse T is applied in the same way, but a pulse C from curve $C_8$ is also present. This pulse makes the flip-flop $87a$ to toggle when the second pulse T is also applied. The output of the flip-flop $87a$ is thus brought into state 1 as well as the input of the flip-flop $87b$ but this last one does not toggle at this time. At the third time base pulse, there is no corresponding pulse of curve $C_8$. Consequently, the flip-flop $87a$ is reset, but the flip-flop $87b$, which has its command input at a state 1, toggles upon receiving said third pulse. The command from the curve $C_8$ has then progressed by one step. With the successive time base pulses T, the first order of the curve $C_8$ is then brought to the successive flip-flops $87c$, $87d$ ... to finally reach the flip-flop $87c$ of the farthest converter $17a$, and, at this time, the flip-flops $87a$ to $87f$ of the various converters 17A to 17D and 17' are in logical states corresponding to that of the curve $C_8$. Consequently, a command word has thus been written in the flip-flops.

After the flow of one word, a synchronization signal is emitted. The synchronization signal has for its effect to transfer the data held in the flip-flops $87a$ to $87f$ into the flip-flops $87a_1$ to $87f_1$ of all the converters. It then appears that the flip-flops $87a_1$ to $87f_1$ play the role of the memories during the transmission of the next word recorded in the flip-flops $87a$ to $87f$.

The next word can be identical to or different from the first word and consequently when the second synchronization signal T'' appears, the initial commands are either confirmed or modified in the memory flip-flops $87a_1$ to $87f_1$.

For the control of the motor 2, three flip-flops $87a$, $87a_1$, $87a_2$ are cascadly provided, and the monostable circuit 91 is provided to be held on during a time interval corresponding to the emission of three words. Three consecutive words giving the same command are then required to control the motor 2 for a one step progression. As explained above, the encoder described with reference to FIGS. 3 and 8 comprises for the changement of views, i.e. for the control of the motor 2, a counter 36 counting up to 5, which means that a command of the motor for changing a view is normally repeated in five successive words.

As it has just explained, three words are required to entail a changement of views, so that the emission of five words to ensure this control includes a safety of two words but the emitted number of five words prevents the occurence of two successive view changements on the flight since three words are required for a changement of views.

As to the control of the flap V by the electro magnet 10, an operation similar to the above one is obtained by the cascade flip-flops $87b$, $87b_1$ and $87b_2$, so that the command is also confirmed to prevent any risk of an erroneous command. The problem of the light control is different since it must be so arranged that either the light intensity reaches a maximum during the emission interval of one word, case of the control at 16F (FIG. 8) or, at the opposite, the light intensity increases gradually and requires a more or less higher number of words depending on the preset selection. Consequently, the data of the first word transferred in the memory flip-flops $87c_1$ to $87f_1$ are used, from the first word in the binary/decimal decoder 93.

Figure 13:
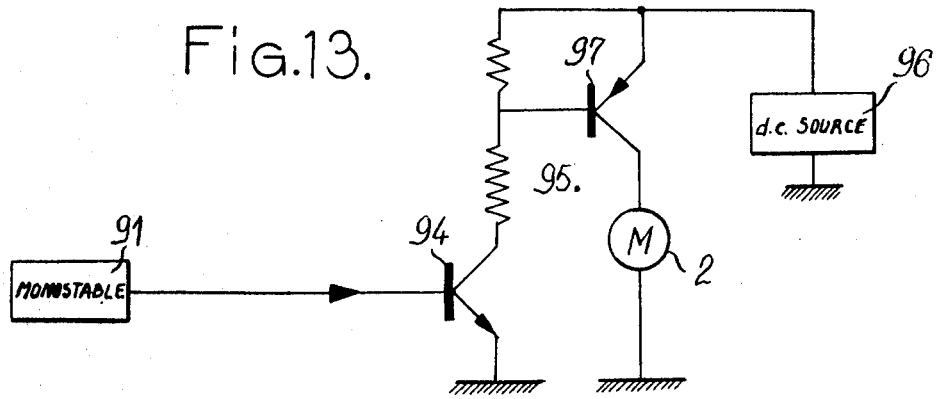

The outputs of the monostables 91 for the control of the changement of views and 92 for the control of the flaps, supply other logical data which must be converted into voltage or current analog data to respectively supply the motor 2 and electro-magnet 10. FIG. 13 shows that the logical signal from the monostable 91 is applied to the base of the first transistor 94 of a power circuit 95 comprising a power supply 96. The output element of the amplifier represented by a transistor 97 then supplies the motor 2 during a duration equal to that of the signal as received to ensure a one-step progression and thus the changement of views.

Figure 12:
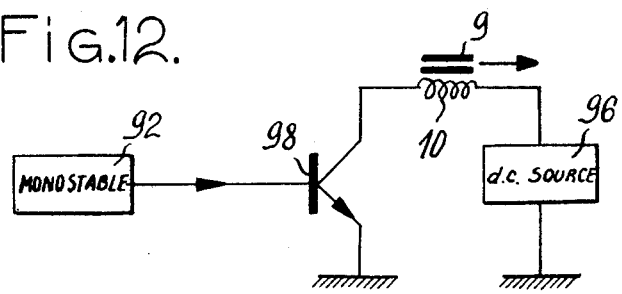

FIG. 12 shows that, for the control of the flap 9, the electro-magnet 10 is put in relation with the power supply 96 while the transistor 98 is brought on in response to the signal delivered by the amplifier circuit 92, so that the flap is maintained in the upward position as long as words comprising this command appears in succession.

FIGS. 14 and 15 illustrate the operation of a type of embodiment of the binary/decimal decoder 93.

The circuit 93 itself consists of an element which is available on the market and which comprises, in the present example, sixteen outputs 0 to 15 each of which including a diode 99. Resistors 100 are connected, serially together, and in parallel with the various outputs, to achieve, in this way, a divider bridge which corresponds, in analog techniques, to the up/down counter 38.

It immediately appears that a quasi-instantaneous lightning, i.e. at the 16F frequency, or else at the end of one word, is obtained when the inputs $A_1$ to $B_1$ each receives a control command in the first word. On the contrary, the light intensity increase, according curves $P_4$ to $P_2$ of FIG. 2, is obtained when a first word includes for instance, only one command on the input $D_1$, all other combinations being obtainable according to the table of binary commands A, as given above.

To use the information of the above divider bridge, FIG. 14 shows that an alternative voltage source 101 feeds a rectifier bridge 102 from which a rectified sine wave 103 is obtained, the successive half-waves of this voltage being applied to a differentiating circuit 104 that deliver pulses 105. The derived pulses 105 are used to command a transistor 106 that entails the discharge of a capacitor 107, linearly charged from a stabilized d-c current supply 108. A sawtooth voltage 109 (curve $C_{23}$ — FIG. 15) is thus obtained, and it is compared in a comparator 110 with the voltage from the voltage divider consisting of resistances 100. At the output of the comparator 110, appear voltage pulses 111 of variable length (curve $C_{24}$) which reproduce the voltage of the voltage divider. Effectively, the comparator 110, receiving the sawtooth voltage 109 as well as the voltage U from the voltage divider, interrupts the generations of the pulses 111 when the divider tension reaches the voltage of a sawtooth 109, which is illustrated by the comparison of the curves $C_{23}$ and $C_{24}$. A new pulse $111a$ of identical or different length is produced at the beginning of each sawtooth 109.

The pulses 111 are differentiated by a circuit including a capacitor 112 to give pulses as illustrated by curve $C_{25}$. The derived pulses from the capacitor 112 are effective in bringing on a transistor 113 through which is fed a firing circuit 114 of a semiconductive member 115 of the firing controlled thyristor or triac type which is connected with an alternative a-c voltage power source 116, in series with the lamp 7.

The firing of the member 115 is produced at a variable time, so that this triac receives only a portion of each half-wave of the current from the alternative a-c voltage power source 116, which is illustrated by stripes on curve $C_{26}$. Effectively, the firing of such semiconductive members is automatically cut-off at each zero crossing of this voltage. It appears from the foregoing that the supply of the lamp 7 depends only on the more or less wide striped part of the half-waves of the supply current, this striped part being a function of the logical data applied to the inputs $a_1$ to $d_1$ of the binary/decimal decoder 93.

Figure 16:
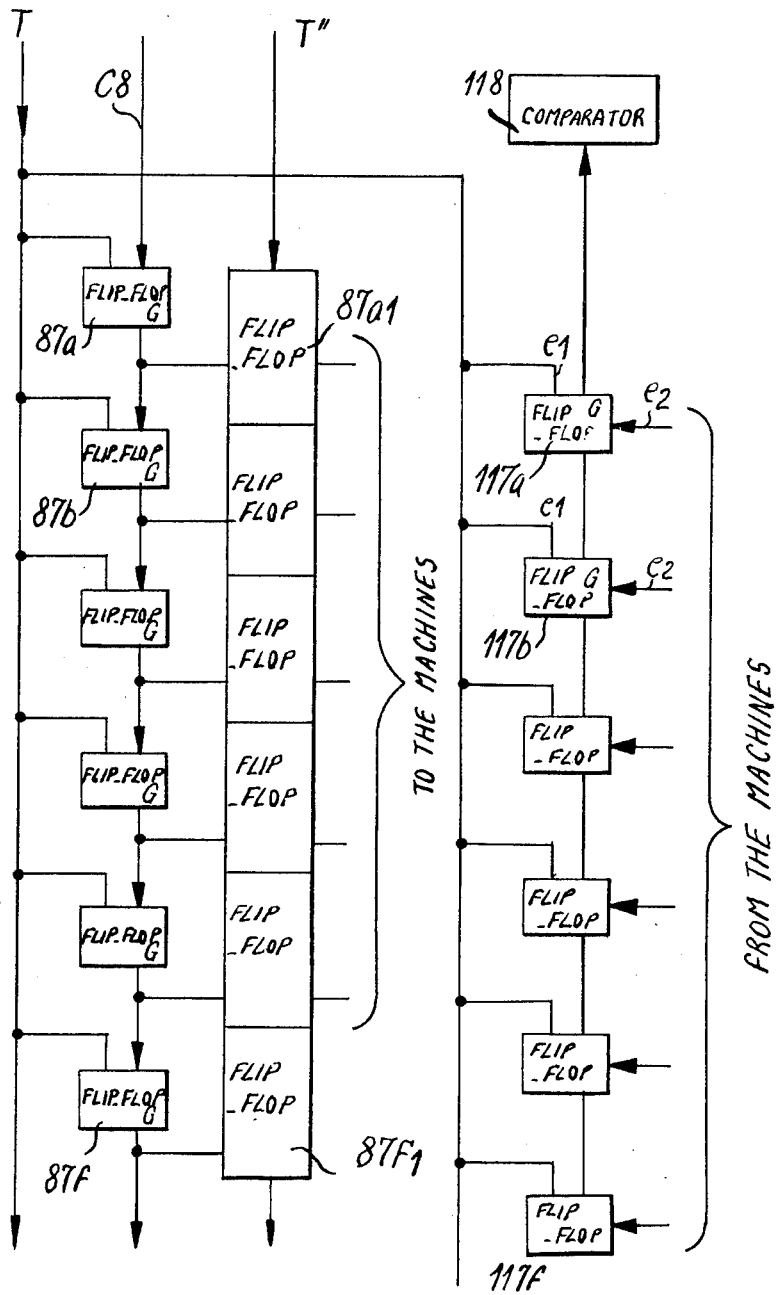
FIG. 16 is a diagram analog to FIG. 11 illustrating an additional characteristic of the invention.

FIG. 16 illustrates a development of the invention showing it is easy to check the proper execution of each controlled operation. As on FIG. 11, the flip-flops $87a$ and the following ones as well as the memory flip-flops $87a_1$ and the following ones are connected exactly according to the description given with reference to FIG. 11. But, an additional set of flip-flops $117a$, $117b$...$117f$ is provided, these flip-flops receiving, on one input $e_1$, the time base signals T in the same manner as the flip-flops $87a$ to $87f$, and on the second input $e_2$, a signal from the controlled apparatus which delivers a signal similar to the signal from which it has been controlled. In this manner, the flip-flops $117a$ to $117f$ are brought to the same state that corresponds to the command signal of a word but with a shift which can be one or several words long. This state is then compared, in a comparator 118, with the recorded word which has been recorded and which was at the origin of the machine operation controls.

If the comparator 118 detects an anomally, an alarm or blocking circuit can be energized.

When all the slides of the drum 1 have been projected, the switch 6 opens the supply circuit of the motor 2. A reset wire is also provided to control the rotation of the drum 1, even if all the slides have not been projected. This command is not effectively a direct portion of the invention and it will not be described with more details.

It can be seen from the preceding description that the invention makes it possible to control any number of operations executed by similar or different machines, since the control data are delivered in a series order. If the number of the operations to be executed exceeds the number of the operations described above, or if the number of the machines to be controlled is greater, it is sufficient to provide words having more than 32 bits.

It should also be noticed that the control made make it possible not only to obtain an on-off control as is the case for the flap 9, but also a delayed control as in the case for the changement of views, and also a progressive control with a variable progressive rate, in either direction, as in the case for the described light command. It is essentially for these last reasons that the invention has been described above in its application to the control of slide projecting machines because this example permits effectively to illustrate the controls that which can be implemented. It has already been explained that similar controls can be achieved for exactly any machines such as machine-tools, and typically lathes, milling machines and the like, press stamping machines, welding machines, . . . etc.

The invention is not limited to the example of embodiment described in details, since various modifications thereof can be made within its scope as shown in the appendant claims.

We claim:

1. Apparatus for the control of working operations of a plurality of machines from binary code commands, the apparatus comprising at least one binary-analog convertor located on every machine, each binary-analog convertor including serially connected input detectors in a number equal to the number in binary code of the functions to be executed by the corresponding machine, cables each comprising at least one conductor to connect together the binary-analog converters of all the machines, so that all the input detectors are serially connected, at least one system for generating and transmitting successive words in binary code which define series successive commands and each of the words containing a number of bit positions corresponding to the number of the input detectors, means to input step by step each bit into the successive detectors so that every detector is brought, at the end of each word, in a state depending on the corresponding bit of the word, and means to convert the state of each input detector into a control command of an operation of the machine.

2. Apparatus according to claim 1, wherein the binary-analog converters comprise flip-flops, output of each flip flop being connected to a first input of an adjacent flip-flop, a second input of each flip-flop being connected to a common conductor connected to a clock signal generator producing a fixed number of signals per word, this number being equal to the number of flip-flops, and the first input of the first flip-flop of the first detector being connected by a conductor to the system that generates signals defining serially arranged commands, whereby the flip-flops successively record the command signals as the clock signals of a same word are emitted.

3. Apparatus according to claim 2, wherein at least a memory circuit is connected at the output of each flip-flop and records the state of the flip-flop at the end of each word.

4. Apparatus according to claim 1, further comprising a generator producing a synchronizing signal between each word, the memory circuits consisting of flip-flops connected by one input with the output of the corresponding flip-flop forming a detector and by another input with a common conductor connecting them to the synchronizing signal generator, so that this signal transfers the detector command signals into the memories before the next word is detected.

5. Apparatus according to claim 4, wherein at least certain input detectors formed by flip-flops are connected with a plurality of flip-flops connected in cascade, all of them being connected to the conductor leading to the synchronizing signal generator, so that a command signal of a word is transmitted to the successive flip-flops connected in cascade after emission of the following words.

6. Apparatus according to claim 1, further comprising a binary/decimal converter connected by each input it includes to a same number of memories themselves corresponding to a same number of detectors, the outputs of the binary/decimal converter being connected with a voltage divider, said voltage divider being itself connected with a receiving circuit controlled by said voltage divider in function of the weight of the information applied to the inputs of the binary/decimal converter by each memory, so that a control function of any shape is obtained.

7. Apparatus according to claim 3 comprising a semi-conductor circuit connected to the output of a flip-flop forming a memory so that said semi-conductor circuit is fired by said flip-flop in one of the states it takes, in ensuring an on-off control of the semi-conductor circuit.

8. Apparatus according to claim 5, wherein a monostable circuit is connected to the outputs of the cascade connected flip-flops, so that said circuit is successively fired again by said flip-flops in generating a command information having a length depending on the number of the flip-flops connected in cascade, on the time constant of the monostable circuit and on the length of the intervals between the synchronizing signals.

9. Apparatus according to claim 1, wherein the system generating the words comprises a console with groups of circuits special for every machine, each group of circuits including at least one circuit for each function of the corresponding machine, said circuits being driven by switches and connected in parallel with the successive inputs of a stepping circuit, the control input of which is connected with the generator of a fixed number of clock signals, so that a step by step scanning of the successive circuits, driven by swtiches, is achieved in synchronism with the emission of the clock signals and produces successive command signals in the conductor leading to the serially connected detectors.

10. Apparatus according to claim 9, wherein at least one of the groups of circuits includes several parallel circuits for a same function of the corresponding circuit, each circuit being connected with a special frequency generator and with a common conductor through its driving switch, said common conductor being connected to an up/down counter with several outputs of different weights respectively connected with the successive inputs of the stepping circuit, so that logical command signals having a number of bits equal to the number of said inputs are succesively formed in relation with the successive scannings of the stepping circuit.

11. Apparatus according to claim 1, further comprising a magnetic recorder with a recording head connected with a two-input switching circuit, these inputs being themselves respectively connected with circuits producing two phase opposed sine-waves, said switching circuit being connected with the conductor on which the series command signals are formed so that said switch connects the recording head alternatively with the circuits producing either of the sine waves depending on the logical state of the signals serially transmitted to said conductor leading to the detector.

12. Apparatus according to claim 11 comprising a sine wave oscillator for the production of the first sine-wave; an inverting amplifier connected with the sine wave oscillator for the production of the second sine wave, phase opposed with the first sine wave; circuits connecting the sine wave oscillator and the inverting amplifier respectively to both inputs of the switching circuit connected with the magnetic recorder; a shaping circuit connected with the sine wave oscillator to produce time base pulses, in synchronism with the frequency of the sine wave oscillator; two pulse counters connected with the shaping circuit by a gate circuit including an inverter, and together by a reset circuit, in order that the countings of the counters are alternate so that the constant number of clock signals be formed by one of the counters and the second of the counters counts a fixed number of pulses during which no clock signal is formed between two words; means to form the synchronization signal during the interval when no clock signal is produced; and linking means to transmit the constant number of signals as well as the synchronizing signal to the stepping circuit.

13. Apparatus according to claim 11 comprising a decoding circuit connected with the reading head of the magnetic recorder, said decoding circuit including reforming circuits of the constant number of clock signals and command signals from phase opposed recorded sine waves; and said decoding circuit being connected with the serially connected detectors of the logic/analog converters of the machines.

14. Apparatus according to claim 1, wherein two complementary logical outputs amplifiers are connected at the output of at least certain of the logic/analog converters on the conductors linking these converters and shaping circuits being connected at the input of said logic/analog converters.

15. Apparatus according to claim 1, wherein each machine comprises command flip-flops serially connected together to the controlled actuator of the machine and to the conductor applying a fixed number of signals, whereby any command word is reformed by said flip-flops after execution of this word by the corresponding machines, and a device comparing the reformed word with the emitted word.

16. A method for repetitively controlling the working operations of machines of the same type or of different types comprising the steps of:
establishing a word which consists of a number of bit positions corresponding at least to the number of operations to be controlled for each machine;
allocating as many bits of the word as there are operations to be controlled for each machine, so that the word contains in series logical data concerning respectively each machine;
transmitting the word to the machines;
detecting the bits serially to provide commands corresponding with the logical states of the word;
sequentially forming new words which contain the same bits or different bits, separated from one another by a time interval;
correlatively transferring the new words to the machines so that the initial received commands are confirmed or modified; and
recording the sequence of the words so formed so that this sequence of words can be used again any number of times for the repetitive control of the same working operations by the same machines or by other groups of machines corresponding to these machines.

17. A method according to claim 16, further comprising the steps of forming a portion of a word, specially formed for at least one machine, so that this portion includes a sequence of bits relative to one operation only, whereby a complex command in binary language can be transmitted to execute said operation in said machine in a variable time interval corresponding both to the number of binary data transmitted by each word and to the number of succesive words established to execute said operation, so that a time varying function is accomplished by said machine.

18. A method according to claim 16, including providing during the time interval between words, at least one synchronization signal; and using said synchronizing signal to initiate memorizing the detected bits.

19. A method according to claim 17, including memorizing the information fed in bits to the machines, sequentially transferring the memorized information so that a number of words is required to transmit the information.

20. A method according to claim 19, including controlling an operation requiring several words, the memorizing step effecting transferring a number of words greater than the number of words required by desired control, but smaller than the double of this number of words in order to prevent a double control.

21. A method according to claim 16, wherein the detecting of the bits is effected simultaneously under control of clock bits in a fixed number for each word, a command bit being introduced only if a corresponding clock bit exists, and wherein the synchronizing bits transferring the data bits is only established after checking the number of clock bits that must be present in the word.

22. A method according to claim 16, including supplying command bits formed from clock bits in a fixed number of each word, and wherein these clock bits are extracted from other clock bits which are continuously formed by rectangular shaping one half-wave of a sine voltage of fixed frequency.

23. A method according to claim 16, including recording command bits on a magnetic medium as they are formed and transmitted for detection.

24. A method according to claim 16, including recording command bits using two sine voltages with opposed phases, either of said two sine waves being selected alternatingly and in succession depending on the bit being in state 0 or 1, so that successive elements of phase opposed sine waves are obtained and which are linked together by a turnup point, a resulting sine wave being recorded on any magnetic medium.

25. A method according to claim 24, wherein among the two phase opposed sine voltages used, the first one is the waveform from which are shaped the continuously prepared clock signals, and the second one is a voltage with a $\pi/2$ phase difference relatively to the first one and is obtained from the first sine wave voltage.

26. A method according to claim 25, wherein for reforming the command signals and the clock signals, both in a fixed numbers for each word, from the alternate phased successive sine waves recorded on the magnetic medium, the shaping of the successive half-waves of said sine waves is achieved, said shaped signals are then added so that the logical signals thus obtained have a frequency double of the sine wave frequency, an edge of the last obtained signals is derived, signals having alternately complementary logical states are shaped from the successive derivates obtained so that clock rectangular signals are established in a number corresponsing to the number of the logical clock signal having a fixed number of signals, and the coincidence is checked between the signals corresponding to
one half-wave of the initial sine wave with the clock signals of fixed number, so that command signals are formed in logical form with a respective length corresponding to the distance separating two up turning points of said sine wave.

27. A method according to claim 26, wherein reformation of the synchronization or confirmation signal intended to separate two words from an alternate phased sine wave is based on counting a number of clock signals obtained for each word, emitting at the end of the counting information having a preset bit, forming a clock signal envelope under control of each clock signal, and checking the possible coincidence between the information formed at the end of the counting of said clock signals and said envelope to establish a synchronization or confirming signal which is thus produced after each word.

28. A method according to claim 26, wherein the last bit of each word is always of a same logical state, this logical state is checked at the end of each word reformed from the successive phase opposed sine waves, and including comparing coincidence between the clock signals and the signals formed by shaping the successive half-waves of the successive phase opposed sine waves, so that the obtained logical command signals independent on the phase of the respective waves, and recording/reading the magnetic medium on which said phaseopposed successive sine-waves are recorded.

29. A method according to claim 28, wherein the always identical state command signals formed at the end of each word is compared with the synchronization signal, and including blocking propagation of the synchronization signal when said always indentical state signal is not appropriate.

30. A method according to claim 16, providing precoding aligned channels, wherein to form the command signals to be transmitted to the various machines, any kind of signals are formed, namely voltage signals, such signals are transmitted in parallel to the precoding aligned chanels each of which includes as many parallel inputs as there are logical command signals that can be formed for each machine, scanning the precoding channels step by step by clock signals in a fixed number for each word, a 1 or 0 state command logical signal being formed when there is a concordance between one or several signals in fixed number and a signal input on a precoding channel, putting the resulting command logical signals in succession in a serial configuration on a common line, and thereupon effecting the detecting step, and recording the command logical signals.

31. Method according to claim 30, wherein at least the command and clock or time base information is serially transmitted.

* * * * *